(12) United States Patent
Nakamura et al.

(10) Patent No.: US 12,284,431 B2
(45) Date of Patent: Apr. 22, 2025

(54) IMAGE CAPTURING APPARATUS WITH COOLING MECHANISM

(71) Applicant: CANON KABUSHIKI KAISHA, Tokyo (JP)

(72) Inventors: Yuta Nakamura, Kanagawa (JP); Yuko Iritani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 18/312,690

(22) Filed: May 5, 2023

(65) Prior Publication Data

US 2023/0379561 A1  Nov. 23, 2023

(30) Foreign Application Priority Data

May 19, 2022 (JP) ................................. 2022-082468

(51) Int. Cl.
*H04N 23/52* (2023.01)
*H04N 23/54* (2023.01)
*H04N 23/68* (2023.01)

(52) U.S. Cl.
CPC ............. *H04N 23/52* (2023.01); *H04N 23/54* (2023.01); *H04N 23/687* (2023.01)

(58) Field of Classification Search
CPC ...... H04N 23/52; H04N 23/531; H04N 23/54; H04N 23/687; H04N 23/53; H04N 23/55; H04N 23/51; G03B 17/55; G03B 17/563; G03B 2205/0038; H05K 7/20145; H05K 7/20154

See application file for complete search history.

(56) References Cited

U.S. PATENT DOCUMENTS

| | | | | |
|---|---|---|---|---|
| 8,964,042 B2 * | 2/2015 | Nozawa | ............. | H04N 23/6815 396/419 |
| 2008/0055420 A1 * | 3/2008 | Orihashi | .............. | H04N 23/687 348/208.4 |
| 2011/0074963 A1 * | 3/2011 | Awazu | ................. | H04N 23/687 348/208.4 |

(Continued)

FOREIGN PATENT DOCUMENTS

| | | |
|---|---|---|
| JP | 2009-071516 A | 4/2009 |
| JP | 2019-008052 A | 1/2019 |

*Primary Examiner* — Lin Ye
*Assistant Examiner* — Tuan H Le
(74) *Attorney, Agent, or Firm* — Cowan, Liebowitz & Latman, P.C.

(57) ABSTRACT

An image capturing apparatus that can cool an image sensor without interfering with an anti-vibration movement of the image sensor. An image sensor substrate implements an image sensor. A control circuit substrate controls an entire apparatus. An anti-vibration mechanism moves the image sensor substrate in a plane perpendicular to an optical axis of a lens. A cooling fan and a first duct are arranged behind the control circuit substrate in an optical axis direction opposite to the lens. A second duct is branched from the first duct and dissipates heat of the image sensor substrate. Inside spaces of the first and second ducts are spatially separated from the substrates. The second duct is arranged at a position that partially overlaps with the image sensor substrate in viewing from a top and that does not touch the image sensor substrate even when the image sensor substrate moves to a closest position.

10 Claims, 9 Drawing Sheets

(56) References Cited

U.S. PATENT DOCUMENTS

| | | | | |
|---|---|---|---|---|
| 2014/0055671 | A1* | 2/2014 | Kawamura | H04N 5/64 |
| | | | | 348/374 |
| 2016/0301819 | A1* | 10/2016 | Petty | G03B 17/55 |
| 2021/0318594 | A1* | 10/2021 | Schmit | G03B 17/55 |
| 2022/0286593 | A1* | 9/2022 | Amano | H04N 23/54 |

* cited by examiner

IMAGE CAPTURING APPARATUS WITH COOLING MECHANISM

BACKGROUND OF THE INVENTION

Field of the Invention

The present invention relates to image capturing apparatuses, and in particular to an image capturing apparatus with a cooling mechanism.

Description of the Related Art

An image capturing apparatus is becoming higher in image quality, such as higher resolution and higher frame rate, of a recorded image. In such an image capturing apparatus, signal processing load and power consumption increase, and signal processing units, such as an image sensor and a data recording unit, generate significant heat. Since performance of electronic components in the image capturing apparatus deteriorate at high temperature, it is necessary to provide a cooling mechanism in order to maintain the performance of the signal processing units even when the heat is generated. For example, Japanese Patent Laid-Open Publications No. 2019-8052 and No. 2009-71516 disclose a heat dissipation means for forcibly air-cooling an image sensor.

In recent years, an image capturing apparatus that is provided with an image stabilization mechanism that absorbs vibration applied to the image capturing apparatus from the outside to prevent image blur by shifting an image sensor within a predetermined range is proposed. Such an image stabilization mechanism has been conventionally cooled by transferring heat of a heat generating portion to a high thermal conductivity member to disperse the heat.

The heat dissipation means of JP2019-8052A is a heat dissipation duct that is placed behind the image sensor in the optical axis direction. And the image sensor is cooled by transferring the heat of the image sensor to the heat dissipation duct and by performing forced air cooling. Such a configuration increases the size of the image capturing apparatus in the optical axis direction.

The heat dissipation means of JP2009-71516A is a heat dissipation duct that is connected with a cooling system that is installed outside the main body, and the image sensor is cooled by forced air cooling with this cooling system. Therefore, there is a problem that the size of the image capturing apparatus as a whole is increased by the amount of the cooling system provided outside the main body. In addition, in the configuration of JP2009-71516A, the air directly hits the image sensor, and no consideration is given to dust-proof and drip-proof for the image sensor.

In the meantime, when the heat dissipation duct is arranged so as not to increase the size of the image capturing apparatus, the movement of the image sensor may be inhibited in the anti-vibration mechanism of a sensor shift type.

SUMMARY OF THE INVENTION

The present invention provides an image capturing apparatus that can efficiently cooling an image sensor without interfering with movement of the image sensor by an anti-vibration mechanism and without increasing the size of the image capturing apparatus.

Accordingly, an aspect of the present invention provides an image capturing apparatus including an image sensor substrate implementing an image sensor for photoelectrically converting light from a lens, a control circuit substrate for controlling an entire apparatus, an anti-vibration mechanism that moves the image sensor substrate in a plane perpendicular to an optical axis of the lens, a cooling fan and a first duct that are arranged behind the control circuit substrate in an optical axis direction opposite to the lens, and a second duct that is branched from the first duct and that dissipates heat of the image sensor substrate. Inside spaces of the first and second ducts are spatially separated from the image sensor substrate and the control circuit substrate. At least a part of the second duct is arranged at a position overlapping with the image sensor substrate in viewing the image capturing apparatus from a top. The second duct is arranged at a position that does not touch the image sensor substrate even when the anti-vibration mechanism brings the image sensor substrate to a closest position.

According to the present invention, the image sensor can be efficiently cooled without interfering with movement of the image sensor by the anti-vibration mechanism and without increasing the size of image capturing apparatus.

Further features of the present invention will become apparent from the following description of exemplary embodiments with reference to the attached drawings.

DESCRIPTION OF THE EMBODIMENTS

Hereafter, an image capturing apparatus 1 according to an embodiment of the present invention will be described by referring to the drawings.

Figure 1A:
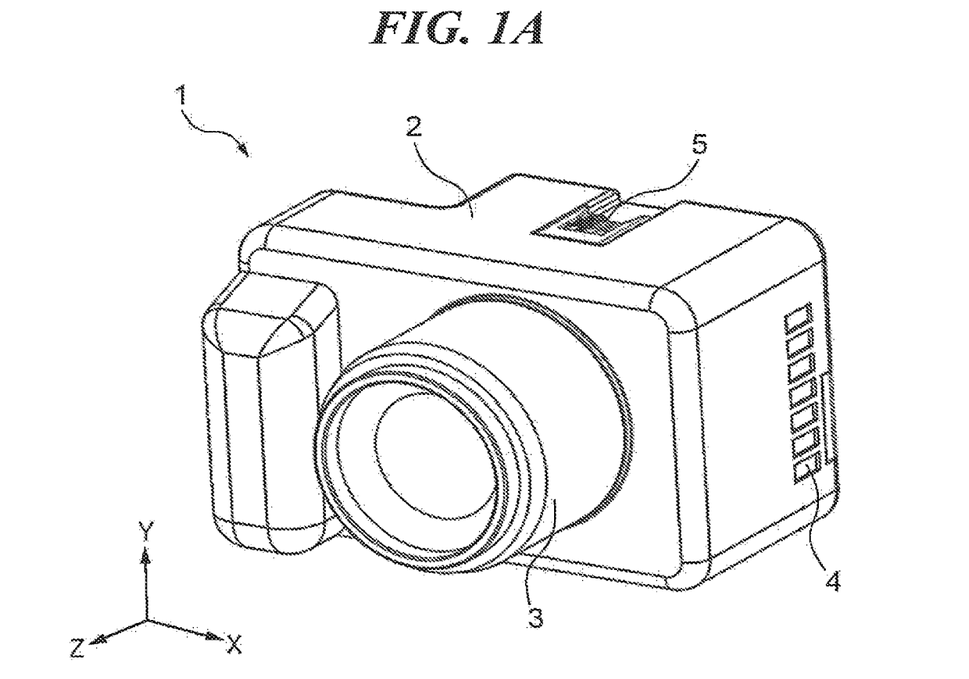
FIG. 1A is a front perspective view showing an image capturing apparatus according to an embodiment of the present invention.
Figure 1B:
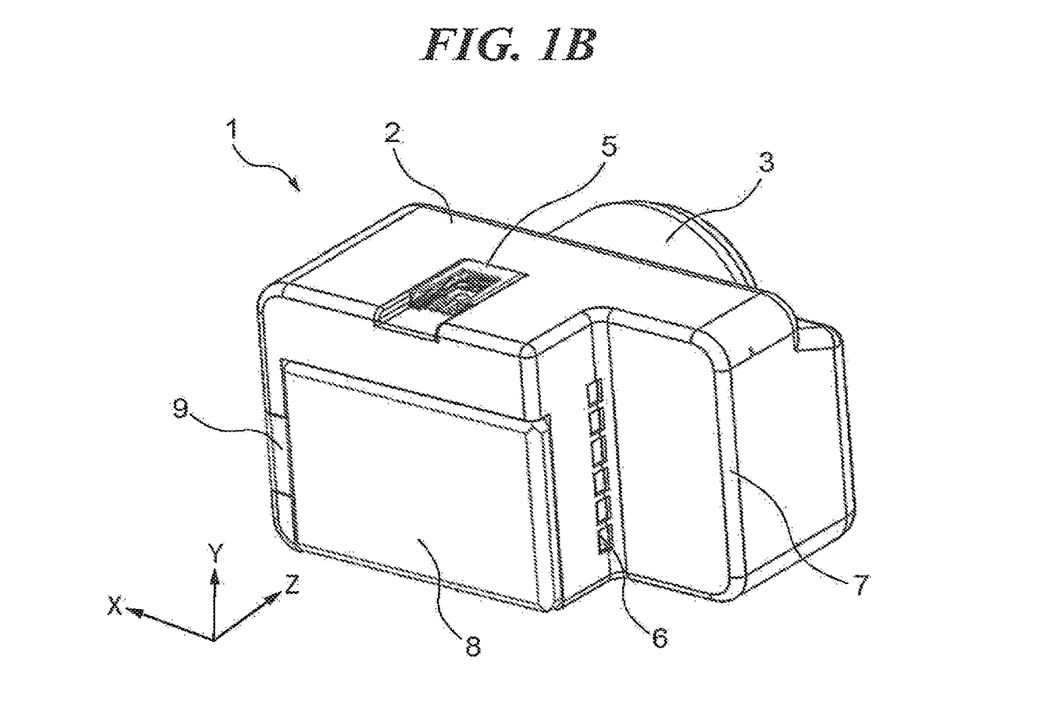
FIG. 1B is a rear perspective view showing the image capturing apparatus.

First, the configuration of the image capturing apparatus 1 is schematically description by referring to FIG. 1A and FIG. 1B. In order to simplify the following description, an XYZ coordinate system is defined as follows. A Z-axis is an optical axis direction of the image capturing apparatus 1, and a direction toward an object to be captured is positive. On a plane orthogonal to the Z-axis, a width direction of the image capturing apparatus 1 shall be an X-axis, and the right side viewed from the object side toward the image capturing apparatus 1 is positive. A vertical direction of the image capturing apparatus 1 shall be a Y-axis, and the direction toward the top is positive.

FIG. 1A is a front perspective view showing the image capturing apparatus 1 and FIG. 1B is a rear perspective view showing the image capturing apparatus 1. As shown in FIG. 1A and FIG. 1B, the image capturing apparatus 1 includes an image capturing apparatus body 2 and a lens 3.

The image capturing apparatus body 2 includes main functions of the image capturing apparatus, such as a power supply unit, a recording unit for recording an image, and various operation units, in addition to a control circuit substrate 16 for controlling the entire image capturing apparatus 1 and an image sensor 101 for photoelectrically converting light from the lens 3, which will be described later with reference to FIG. 3 and FIG. 4. As shown in FIG. 1A, the lens 3 is attached to the image capturing apparatus 1 at the side of the object to be captured (+Z direction). The lens 3 can be replaced in accordance with a capturing situation.

As shown in FIG. 1A, the image capturing apparatus body 2 has an exhaust port 4 at the right side (+X direction) viewed from the object side. High temperature air inside the image capturing device body 2 is discharged from the exhaust port 4 to the outside by a forced air cooling mechanism using a cooling fan 17 described later. On the top (+Y direction) of the image capturing apparatus body 2, an accessory shoe 5 (an external device attachment part) to which an external accessory (external device) can be attached is provided.

As shown in FIG. 1B, the image capturing apparatus body 2 has an intake port 6 at the left side (−X direction) of the image capturing apparatus body 2 viewed from the object side. Cold outside air is taken into the main body through the intake port 6 by the forced air cooling mechanism using the cooling fan described later. The intake port 6 is provided on a side surface part that has a step from a grip part 7 for gripping the image capturing apparatus body 2, and is arranged in a place hardly covered by a hand even when a user grips the image capturing apparatus 1. Further, a panel 8 is mounted on the back surface (−Z direction) of the image capturing apparatus body 2 and is rotatable with respect to the image capturing apparatus body 2 on a rotation hinge 9.

Figure 2A:
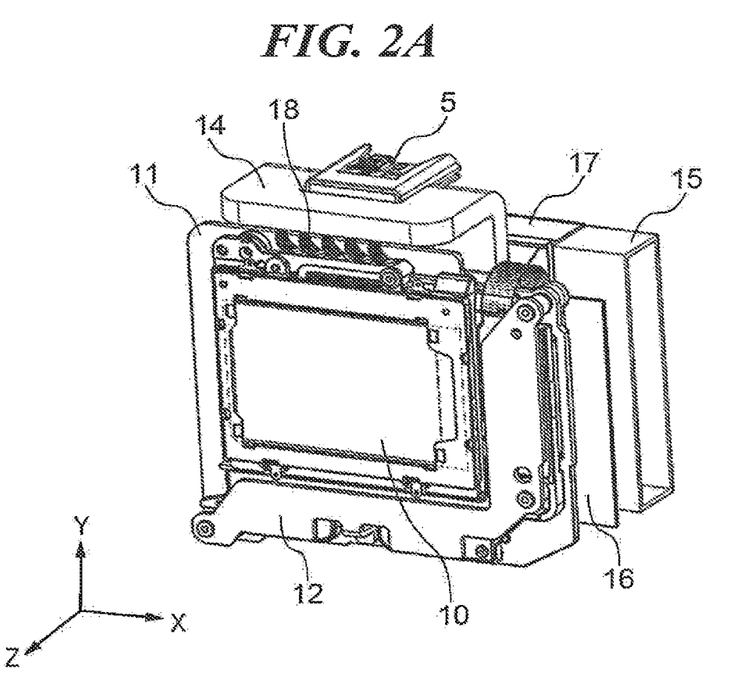
FIG. 2A is a front perspective view showing internal components of the image capturing apparatus.
Figure 2B:
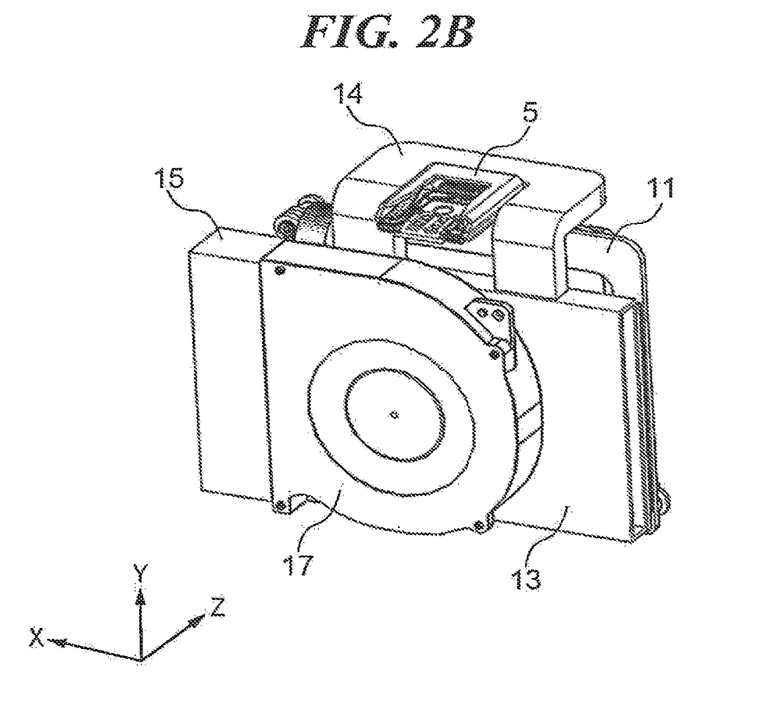
FIG. 2B is a rear perspective view showing the internal components of image capturing apparatus.

Next, outlines of the internal components of the image capturing apparatus 1 will be described using FIG. 2A, FIG. 2B, and FIG. 3. FIG. 2A is a front perspective view showing the internal components of the image capturing apparatus 1, and FIG. 2B is a rear perspective view showing the internal components of the image capturing apparatus 1. FIG. 3 is an exploded perspective view showing the internal components of the image capturing apparatus 1.

Figure 3:
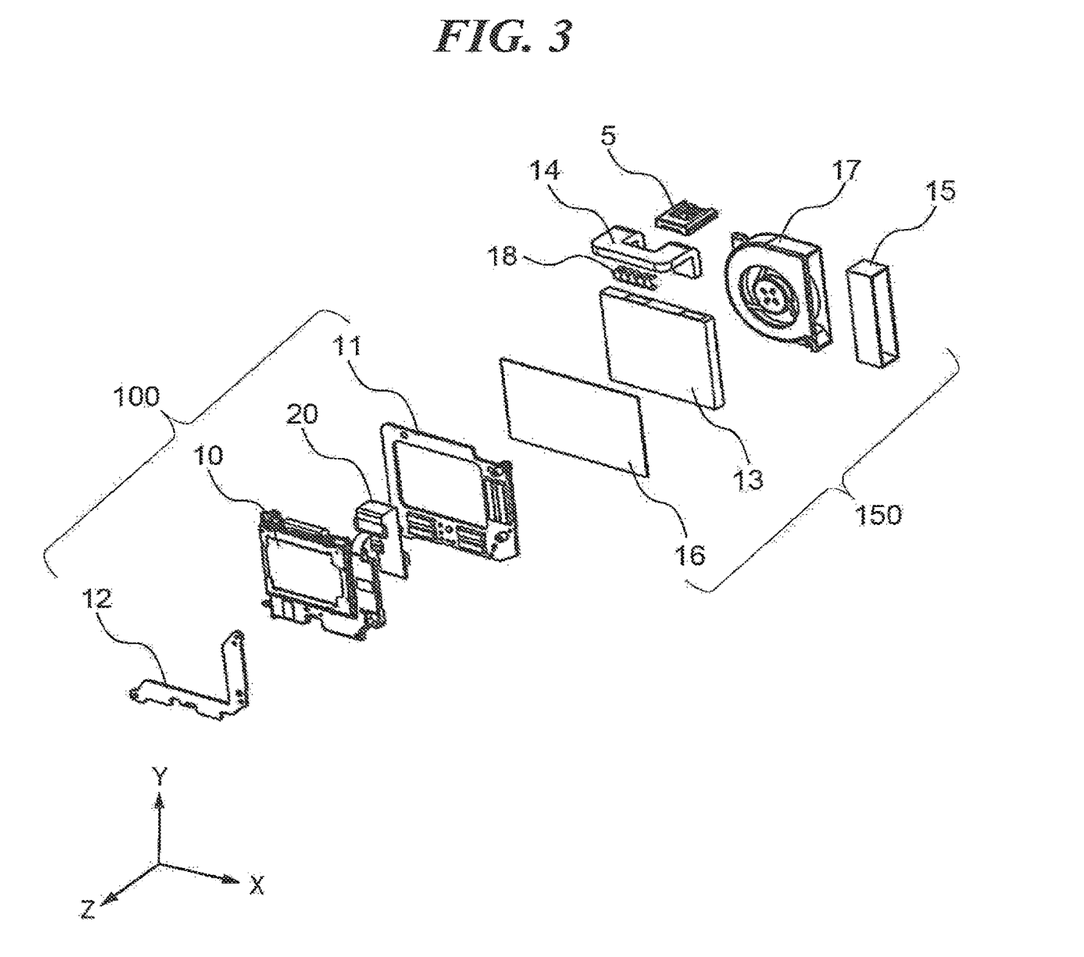
FIG. 3 is an exploded perspective view showing the internal components of the image capturing apparatus.

As shown in FIG. 2A, FIG. 2B and FIG. 3, an image sensor unit 10, an anti-vibration fixing unit 11, a front metal plate 12, a first duct 13, a second duct 14, a third duct 15, the control circuit substrate 16, and the cooling fan 17 are built in the image capturing apparatus 1. Furthermore, the image capturing apparatus 1 includes heat transfer members 18, the accessory shoe 5, an electrical connection member 20 (FIG. 3). In this embodiment, only the configuration components related to the present invention are described, and the descriptions of the other configuration components are omitted.

As shown in FIG. 3, the image sensor unit 10, anti-vibration fixing unit 11, front metal plate 12, and electrical connection member 20 constitute an image capturing unit 100. The image sensor unit 10 is movably held by the anti-vibration fixing unit 11 and the front metal plate 12, and accordingly, the anti-vibration mechanism for the image sensor unit 10 is constituted.

As also shown in FIG. 3, the control circuit substrate 16, first duct 13, second duct 14, third duct 15, cooling fan 17, heat transfer members 18, and accessory shoe 5 constitute a main unit 150. The image capturing unit 100 and the main unit 150 are electrically connected through the electrical connection member 20. The control circuit substrate 16 that controls the functions of the image capturing apparatus 1 is thermally connected to the first duct 13. The cooling fan 17 is what is called a centrifugal fan, and discharges air taken in from a surface direction to a centrifugal (side surface) direction. Although the details of air flow will be described later, the image capturing apparatus 1 takes in air from the above-described intake port 6 by the cooling fan 17, lets the air flow through the inside of the image capturing apparatus body 2, and discharges the heated air from the exhaust port 4 to dissipate heat.

The configuration of the image capturing unit 100 with an anti-vibration function will be described by referring to FIG. 4. FIG. 4 is an exploded perspective view showing the configuration of the image capturing unit 100.

Figure 4:
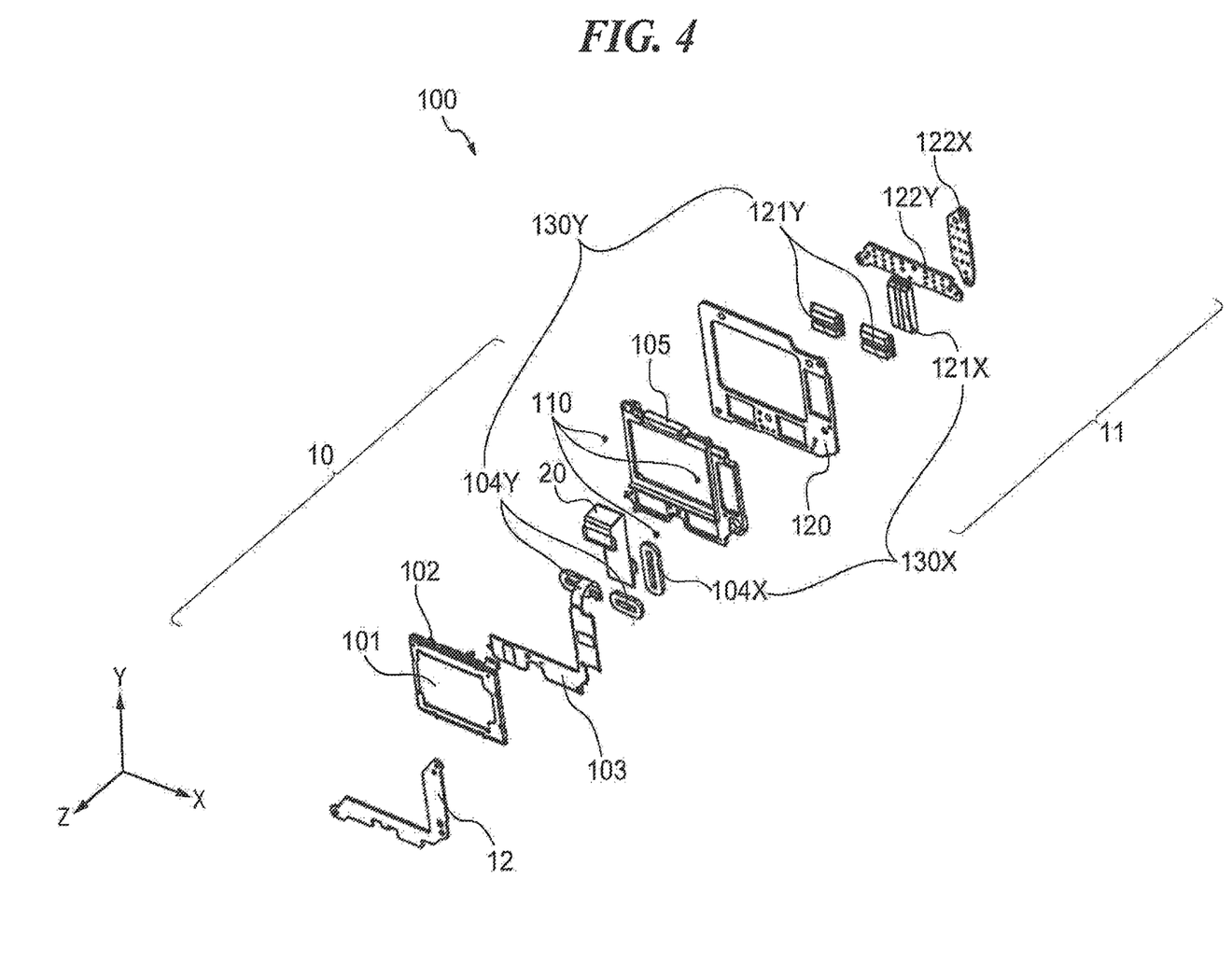
FIG. 4 is an exploded perspective view showing a configuration of an image capturing unit in FIG. 3

As shown in FIG. 4, in the image capturing unit 100, the image sensor unit 10 consists of the image sensor 101, an image sensor substrate 102, a flexible sensor substrate 103, a first coil 104X, a pair of second coils 104Y, and an image sensor holding member 105.

Also, in the image capturing unit 100, the anti-vibration fixing unit 11 consists of a rear fixing plate 120, a first permanent magnet 121X, a pair of second permanent magnets 121Y, a first rear metal plate 122X and a second rear metal plate 122Y.

The image sensor 101 is mounted to the image sensor substrate 102 and is held by the image sensor holding member 105 because the image sensor substrate 102 is secured to the image sensor holding member 105 by adhesion. The flexible sensor substrate 103 is fixed to the image sensor holding member 105 with a double-sided tape, screw, or the like. The first coil 104X and the second coils 104Y are arranged so as to be accommodated in the opening of the image sensor holding member 105 and are covered with the flexible sensor substrate 103.

The first permanent magnet 121X and the second permanent magnets 121Y are arranged so as to be accommodated in the opening of the rear fixing plate 120 and are held by engagement with the contours. The first rear metal plate 122X and the second rear metal plate 122Y are fixed to the rear fixing plate 120 by the screw so as to cover the first permanent magnet 121X and the second permanent magnets 121Y, respectively. The first duct 13 (FIG. 3) is fixed to the rear fixing plate 120 with screw.

The image sensor unit 10 is sandwiched between the anti-vibration fixing unit 11 and the front metal plate 12 in FIG. 3 and is held. A plurality of ball members (not shown) are interposed between the rear fixing plate 120 and the anti-vibration fixing unit 11 and the image sensor unit 10.

The above-mentioned first coil 104X and first permanent magnet 121X are arranged so as to face each other in the optical axis direction, and their outsides are respectively covered by the front metal plate 12 and the first rear metal plate 122X. Hereinafter, a moving force generation unit based on a voice coil motor (VCM) method of the first coil 104X and the first permanent magnet 121X is referred to as a first moving mechanism 130X (anti-vibration mechanism). When electric current flows through the first coil 104X via the flexible sensor substrate 103, the first moving mechanism 130X generates force for moving the image sensor unit 10 in the X direction (Yaw direction), and the position of the image sensor unit 10 can be controlled.

Similarly, the second coils 104Y and the second permanent magnets 121Y are arranged so as to face each other in the optical axis direction, and their outsides are respectively covered by the front metal plate 12 and the second rear metal plate 122Y. Hereinafter, the moving force generation unit based on the VCM method of the second coils 104Y and the second permanent magnets 121Y is referred to as a second moving mechanism 130Y (anti-vibration mechanism). When electric current flows to the second coils 104Y via the flexible sensor substrate 103, the second moving mechanism 130Y generates force for moving the image sensor unit 10 in the Y direction (Pitch direction) or force for moving the image sensor unit 10 in a rotation direction (Roll direction) based on a direction of the flowing electric current. Thereby, the position of the image sensor unit 10 can be controlled.

Specifically, when external force is applied to the image capturing apparatus 1, the control circuit substrate 16 detects shake amounts of the surface that is perpendicular to the optical axis in the X direction, Y direction, and Roll direction caused by the external force with sensors (not shown). Next, the control circuit substrate 16 causes the first moving mechanism 130X and the second moving mechanism 130Y to move the image sensor unit 10 so as to cancel the shake amounts. This can correct image shake caused by the camera shake occurring in the image capturing apparatus 1.

Figure 5A:
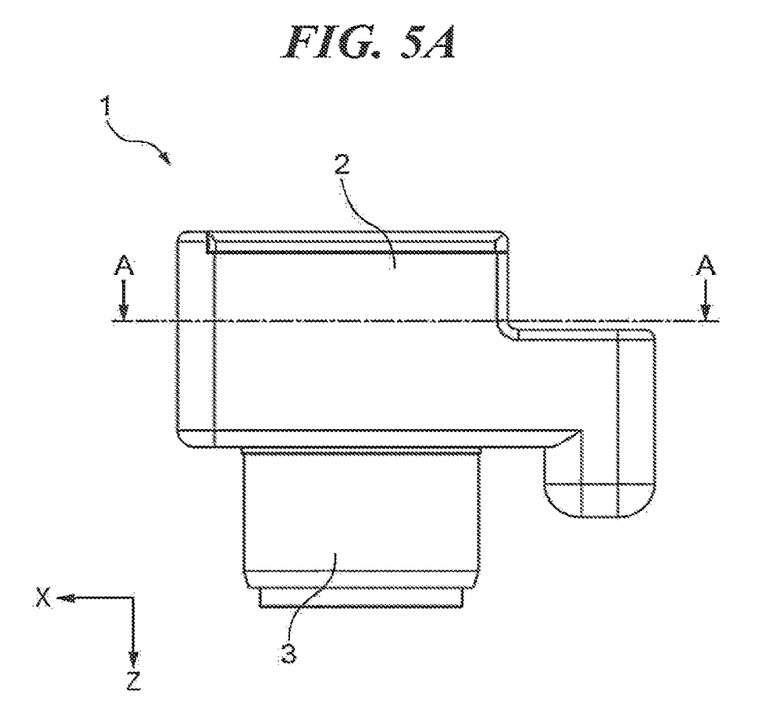
FIG. 5A is a bottom view showing the image capturing apparatus.
Figure 5B:
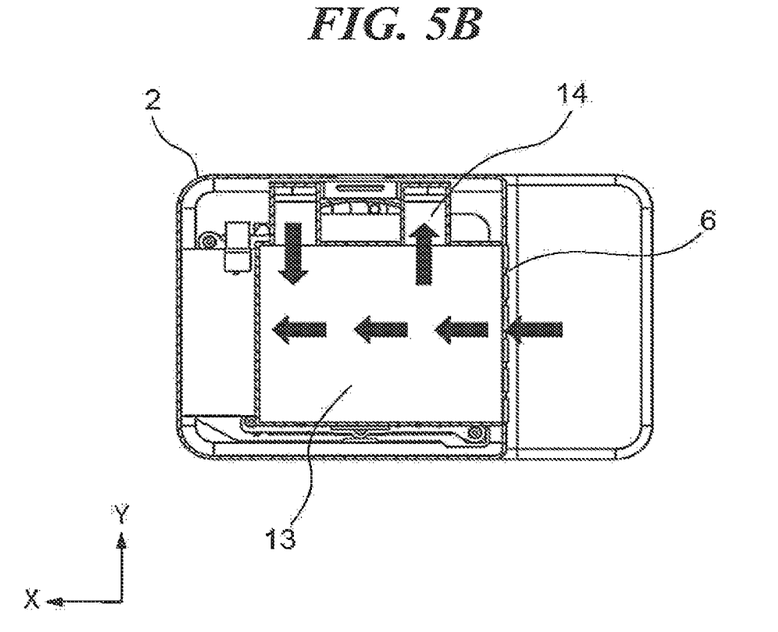
FIG. 5B is a cross-sectional view taken along a line A-A in FIG. 5A.

A heat dissipation structure of the image capturing apparatus 1 will be described using FIG. 5A, FIG. 5B, FIG. 6A, FIG. 6B, and FIG. 6C. FIG. 5A is a bottom view of the image capturing apparatus 1, and FIG. 5B is a cross-sectional view taken along a line A-A in FIG. 5A.

Figure 6A:
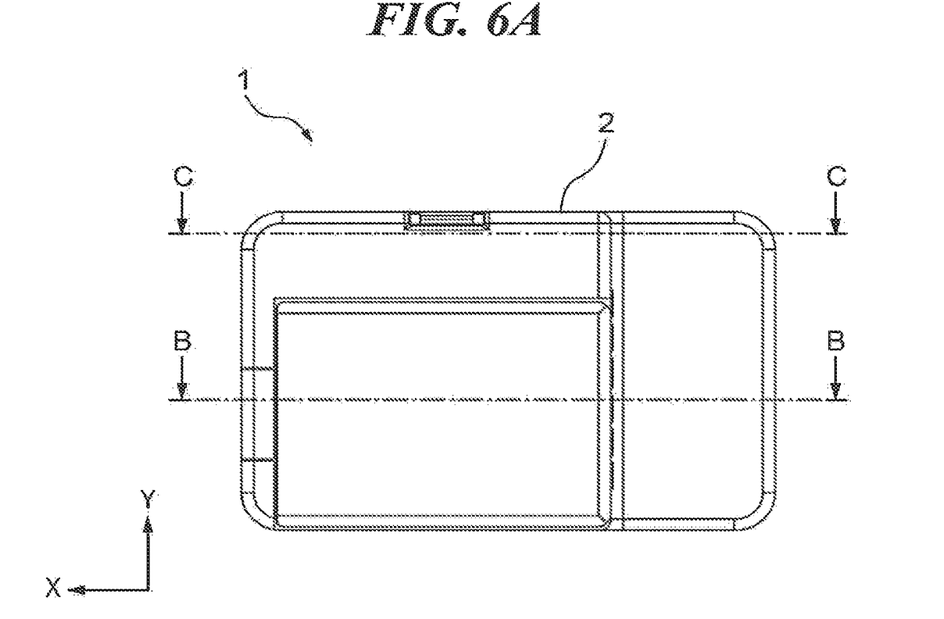
FIG. 6A is a rear view showing the image capturing apparatus.
Figure 6B:
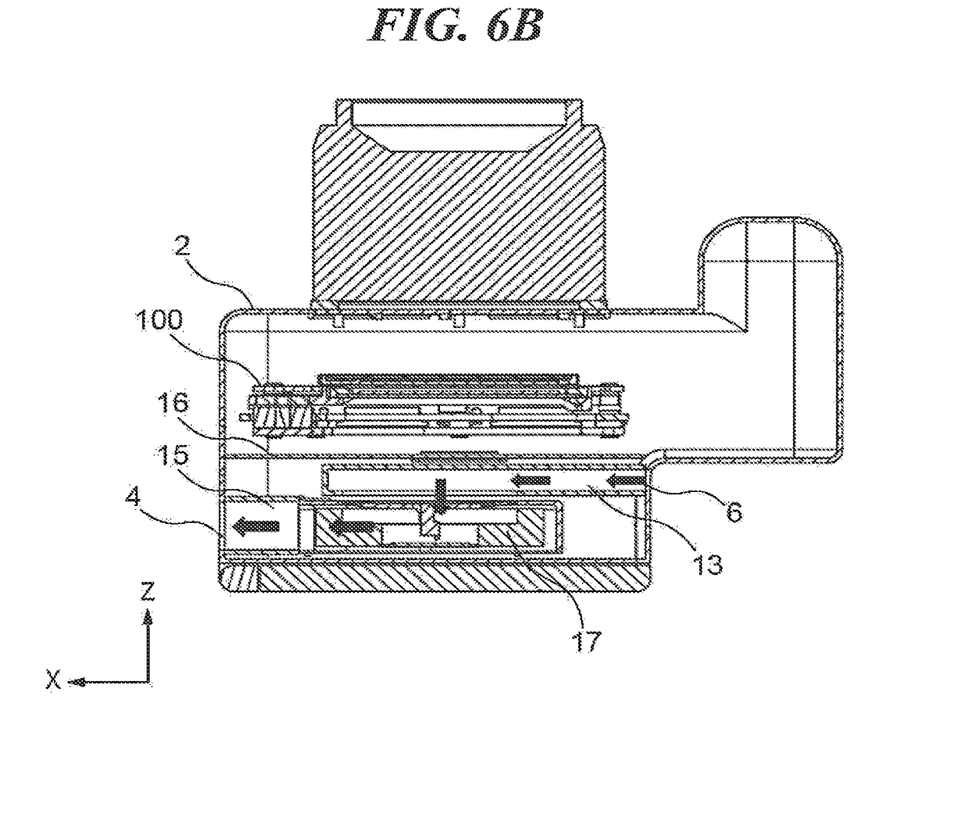
FIG. 6B is a cross-sectional view taken along a line B-B in FIG. 6A.
Figure 6C:
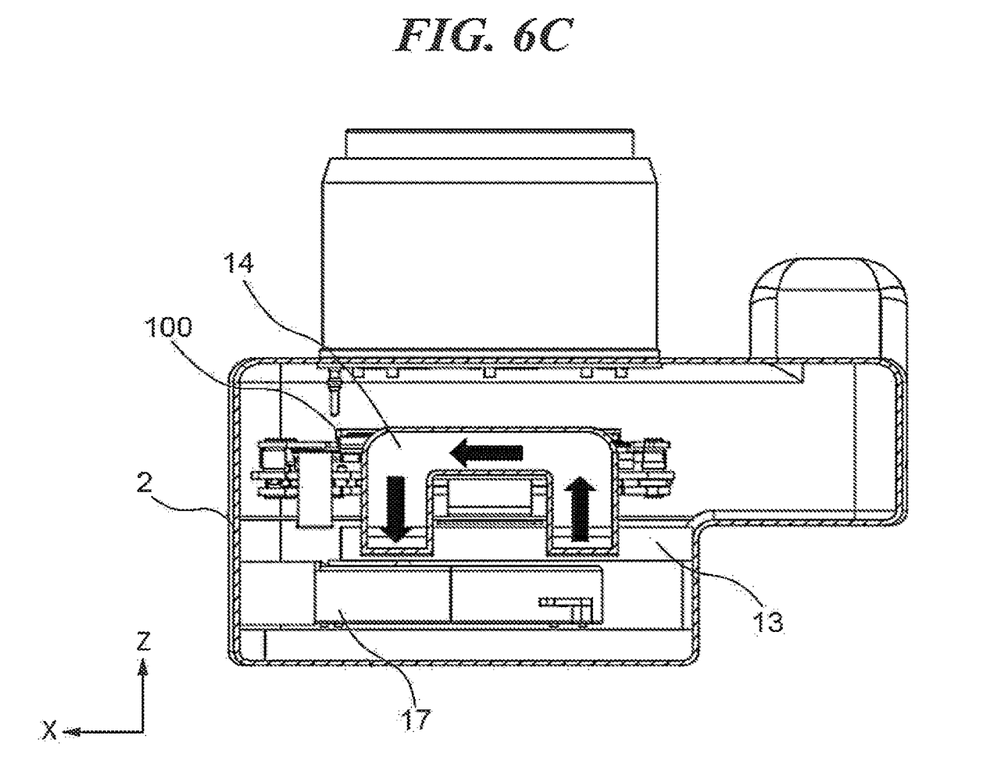
FIG. 6C is a cross-sectional view taken along a line C-C in FIG. 6A.

FIG. 6A is a rear view showing the image capturing apparatus 1, FIG. 6B is a cross-sectional view taken along a line B-B in FIG. 6A, and FIG. 6C is a cross-sectional view taken along a line C-C in FIG. 6A.

As shown in FIG. 6B, heat generated by the control circuit substrate 16 is transferred to the first duct 13 that is molded from high thermal conductivity metal, such as aluminum, through a thermal conductivity member (not shown). The cooled outside air taken in by the cooling fan 17 enters the inside of the image capturing apparatus 1 through the intake port 6 and flows into the first duct 13. As a result, the outside air exchanges heat with the first duct 13 that has become the high temperature by the heat generation of the control circuit substrate 16. The high temperature air is taken into the cooling fan 17 and is discharged to the outside from the exhaust port 4 through the third duct 15.

As shown in FIG. 6C, heat generated by the image sensor substrate 102 of the image sensor unit 10 within the image capturing unit 100 is transferred to the second duct 14 that is molded from high thermal conductivity metal, such as aluminum. Details of the heat transfer method from the image sensor substrate 102 to the second duct 14 will be described later.

As shown in FIG. 5B and FIG. 6C, cool outside air taken in by the cooling fan 17 enters the inside of the image capturing apparatus 1 via the intake port 6 and passes through the first duct 13. Thereafter, the cool air is branched to the second duct 14, and exchanges heat with the second duct 14 that becomes high temperature by the heat generation of the image sensor substrate 102. The air that becomes high temperature is taken into the cooling fan 17 through the first duct 13 again, and is discharged to the outside from the exhaust port 4 through the third duct 15.

As described above, the heat of the image sensor substrate 102 and the control circuit substrate 16, which are main heat sources of the image capturing apparatus body 2, can be discharged to the outside of the image capturing apparatus 1 by the forced air cooling mechanism using the cooling fan 17 as mentioned above.

Also as described above, the flow path of the air by the forced air cooling mechanism passes through the first duct 13, the second duct 14, the third duct 15, the inside of the cooling fan 17. Therefore, inside the image capturing apparatus body 2, the space used as the air flow path by the forced air cooling mechanism and the space including the other configuration elements, such as the image capturing unit 100 and the control circuit substrate 16, are spatially separated mutually. That is, the outside air taken into the inside of the image capturing apparatus body 2 by the forced air cooling mechanism does not directly contact with the electrical components related to image capturing, such as the image capturing unit 100 and the control circuit substrate 16. Therefore, even when a water drop or dust enters the inside of the image capturing apparatus body 2 from the exhaust port 4 or the intake port 6, dust-proof and drip-proof of the electric components can be achieved.

Figure 7A:
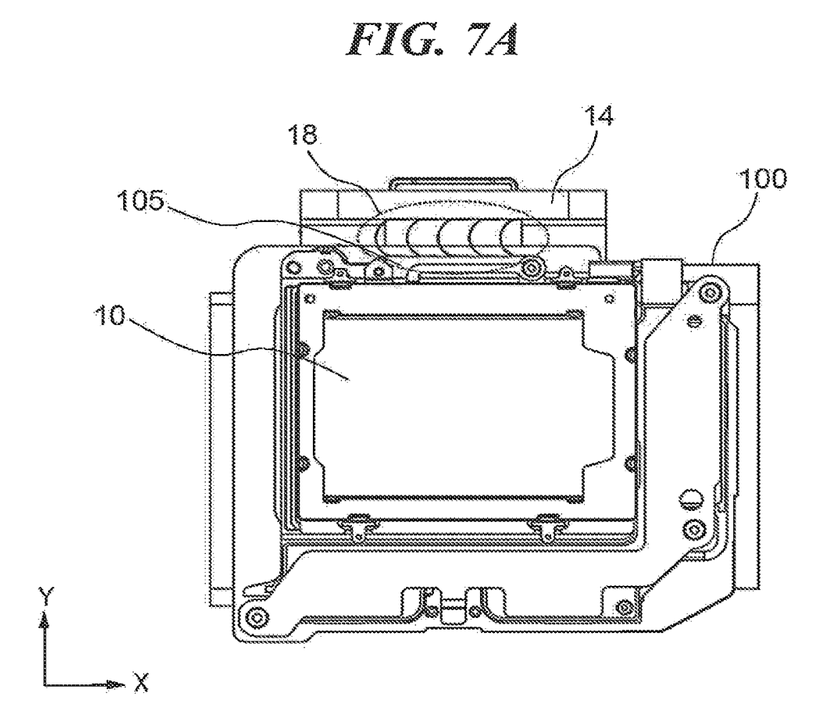
FIG. 7A is a front view showing an arrangement example of internal components of the image capturing apparatus.
Figure 7B:
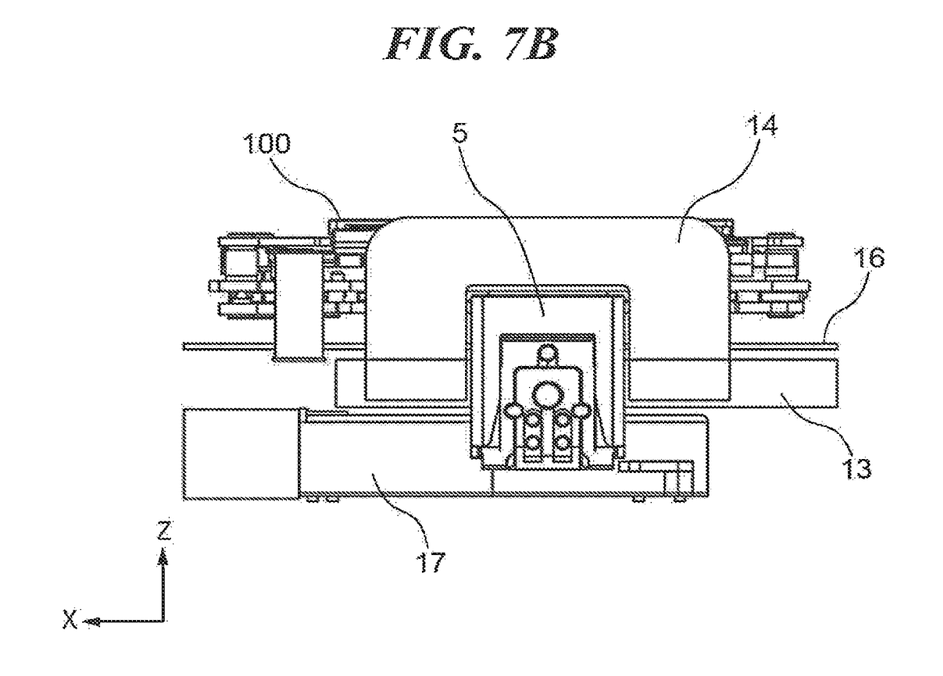
FIG. 7B is a top view showing the arrangement example of the internal components of the image capturing apparatus.

The mechanism of transferring heat to the second duct 14 will be described using FIG. 7A and FIG. 7B. FIG. 7A is a front view showing an arrangement example of the internal components of the image capturing apparatus 1. FIG. 7B is a top view showing the arrangement example of the internal components of the image capturing apparatus 1.

As shown in FIG. 7B, the second duct 14 branched from the first duct 13 passes above (+Y side) the control circuit substrate 16 and passes in front (+Z side) of the accessory shoe 5 in a direction (X direction) orthogonal to the optical axis so as to wrap around the accessory shoe 5. At this time, when the image capturing apparatus 1 is viewed from the top (+Y side), the second duct 14 is arranged at a position overlapping with the image capturing unit 100. Further, the second duct 14 passes through the upper side (+Y side) of the control circuit substrate 16 again and is connected to the first duct 13. In this configuration, since the second duct 14 is located above the image capturing unit 100, it is possible to prevent an increase in the optical axis direction of the image capturing apparatus body 2 due to the addition of the structure for the heat dissipation of the image sensor unit 10.

Moreover, the second duct 14 is arranged at a position that does not touch the image capturing unit 100 even when the anti-vibration mechanism brings the image capturing unit 100 to the closest position. That is, the second duct 14 is arranged at the position that does not interfere with the movement of the image capturing unit 100 driven by the anti-vibration mechanism.

Heat generated by the image sensor substrate 102 of the image sensor unit 10 is transferred to the image sensor holding member 105 to which the image sensor substrate 102 is fixed. The image sensor holding member 105 is preferably molded from high thermal conductivity metal, such as aluminum. The top portion (+Y side) of the image sensor holding member 105 and the bottom portion (−Y side) of the second duct 14 are thermally connected via the heat transfer members 18 as shown in FIG. 7A. Each of the heat transfer members 18 is a sheet-like thin and soft member having high thermal conductivity, such as a graphite sheet.

Each of the heat transfer members 18 has a curve shape that has two or more normal vectors in the XY plane perpendicular to the optical axis. For example, it is an approximate C-shape as shown in FIG. 7A. The length of the heat transfer members 18 in the XY plane perpendicular to the optical axis is longer than the maximum moving amount of the image sensor unit 10 driven by the anti-vibration mechanism. Therefore, the heat transfer members 18 do not interfere with the movement of the image sensor unit 10 driven by the anti-vibration mechanism and allows the heat transfer to the second duct 14.

It is preferable that temperature distribution of the image sensor 101 be uniform as possible to reduce an influence impact on image quality. Therefore, as shown in FIG. 7A, the heat transfer members 18 are arranged at equal intervals between the second duct 14 and the image sensor holding member 105 to connect them. Thereby, a plurality of heat transfer paths from the image sensor substrate 102 to the second duct 14 can be secured, and the temperature distribution of the image sensor 101 can be unified.

Next, a case where the image capturing apparatus 1 is provided with another heat transfer member 200 in place of the heat transfer members 18 will be described using FIG. 8A and FIG. 8B.

Figure 8A:
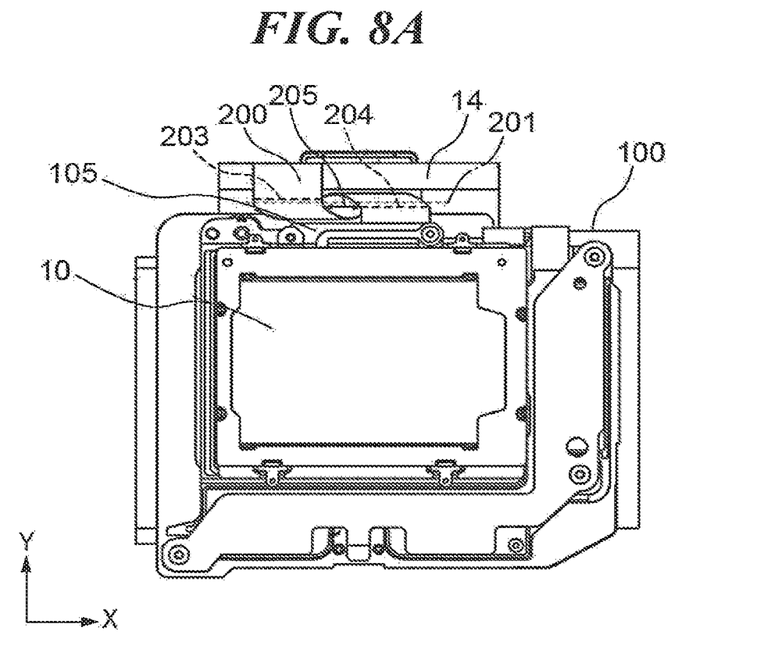
FIG. 8A is a front view showing another arrangement example of the internal components of the image capturing apparatus.
Figure 8B:
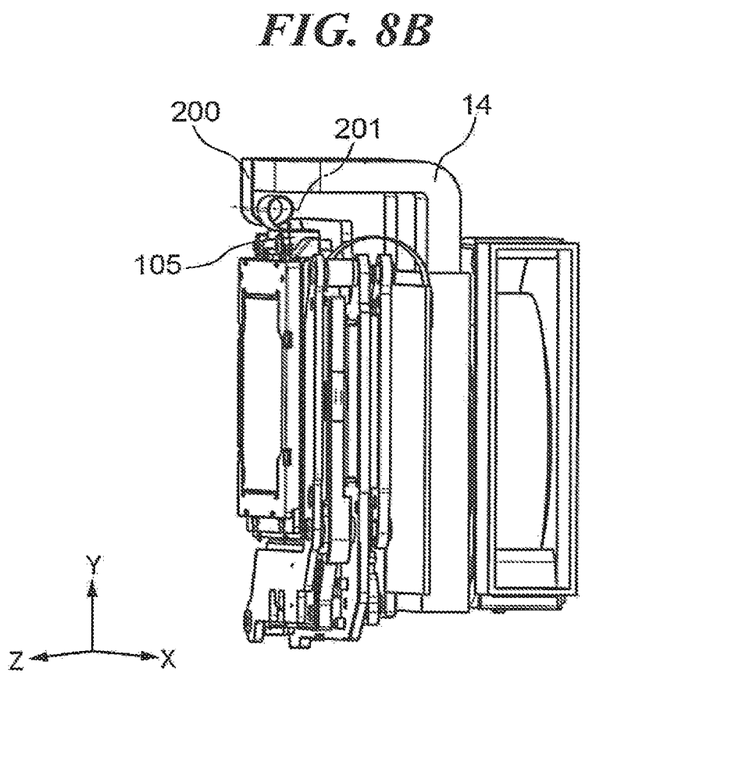
FIG. 8B is a perspective view showing the other arrangement example of the internal components of the image capturing apparatus.

FIG. 8A is a front view showing another arrangement example of the internal components of the image capturing apparatus 1, and FIG. 8B is a perspective view showing the other arrangement example of the internal components of the image capturing apparatus 1.

In the example shown in FIG. 8A and FIG. 8B, the image sensor holding member 105 and second duct 14 are thermally connected via the heat transfer member 200. Here, the heat transfer member 200 is a sheet-like thin and soft member having high thermal conductivity, such as a graphite sheet. One end of the heat transfer member 200 is attached to the second duct 14 and the other end is attached to the image sensor holding member 105. The heat transfer member 200 forms a spiral shape around an axis 201 parallel to the X direction (a second direction) that is perpendicular to both of the optical axis and the Y direction. The spiral is formed by rotating 360 degrees from a start point 203 to an end point 204 while moving around the axis 201 to the X positive direction.

In the spiral form of the heat transfer member 200, a gap 205 between adjacent arcs is longer than the maximum moving amount of the image sensor unit 10 driven by the anti-vibration mechanism in the X direction. When the image sensor unit 10 is moved in the X direction by the anti-vibration mechanism, the gap 205 between the arcs is also extended. Therefore, the heat transfer member 200 can transfer heat without interfering with the movement of the image sensor unit 10 in the X direction by the anti-vibration mechanism.

Moreover, when the image sensor unit 10 is moved in the Y direction by the anti-vibration mechanism so as to separate from the image sensor holding member 105, the arcs of the spiral decreases. And conversely, when the image sensor unit 10 is moved in a direction closer to the image sensor holding member 105, the arcs of the spiral increases. That is, the heat transfer member 200 disperses and absorbs the change in the length in the Y direction by changing the size of the arcs of the spiral. Accordingly, the heat transfer member 200 can transfer heat without interfering with the movement of the image sensor unit 10 in the Y direction by the anti-vibration mechanism.

If the graphite sheet used as the heat transfer member 200 is folded, the thermal conduction effect is greatly reduced. However, since the heat transfer member 200 has the above-described spiral shape, the extra length of the heat transfer member 200 required for the movement of the image sensor unit 10 by the anti-vibration mechanism is dispersed and absorbed by changing the diameter of the arcs or the gap between the arcs. Therefore, the heat transfer member 200 is not folded and the heat conduction effect of the graphite sheet is not reduced. In addition, a developed shape of the heat transfer member 200 in an unassembled state is a belt-like substantially rectangular shape (not shown). As a result, since the sheet transfer member 200 can be taken from a sheet material without waste, it can be manufactured at low cost.

The above-described configuration allows the heat generated by the image sensor substrate 102 of the image sensor unit 10 to efficiently transfer to the second duct 14 without increasing the size of the image capturing apparatus body 2 in the optical axis direction.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-082468, filed May 19, 2022, which is hereby incorporated by reference herein in its entirety.

What is claimed is:

1. An image capturing apparatus comprising:
    an image sensor substrate implementing an image sensor for photoelectrically converting light from a lens;
    a control circuit substrate for controlling an entire apparatus;
    an anti-vibration mechanism that moves the image sensor substrate in a plane perpendicular to an optical axis of the lens;
    a cooling fan and a first duct that are arranged behind the control circuit substrate in an optical axis direction opposite to the lens; and
    a second duct that is branched from the first duct and that dissipates heat of the image sensor substrate,
    wherein inside spaces of the first and second ducts are spatially separated from the image sensor substrate and the control circuit substrate,
    wherein at least a part of the second duct is arranged at a position overlapping with the image sensor substrate in viewing the image capturing apparatus from a top, and
    wherein the second duct is arranged at a position that does not touch the image sensor substrate even when the anti-vibration mechanism brings the image sensor substrate to a closest position.

2. The image capturing apparatus according to claim 1, wherein an external device attachment part capable of attaching an external device is disposed in the top of the image capturing apparatus, and
    wherein at least a part of a flow path inside the second duct passes in front of the external device attachment part in the optical axis direction.

3. The image capturing apparatus according to claim 1, further comprising:

an image sensor holding member that holds the image sensor substrate; and at least one heat transfer member that connects the image sensor holding member and the second duct, wherein each of the at least one heat transfer member has a shape having at least two normal vectors in a plane perpendicular to the optical axis.

4. The image capturing apparatus according to claim 3, wherein the at least one heat transfer member comprises a plurality of heat transfer members that are arranged at equal intervals between the image sensor holding member and the second duct.

5. The image capturing apparatus according to claim 1, further comprising:

an image sensor holding member that holds the image sensor substrate; and a heat transfer member that connects the image sensor holding member and the second duct, wherein the heat transfer member forms a spiral shape around an axis.

6. The image capturing apparatus according to claim 5, wherein said axis is parallel to a width direction of the image capturing apparatus.

7. The image capturing apparatus according to claim 6, wherein a gap between adjacent arcs of the spiral shape is longer than a maximum moving amount of the image sensor substrate in the width direction by the anti-vibration mechanism.

8. The image capturing apparatus according to claim 6, wherein the heat transfer member changes a size of the arcs of the spiral when the anti-vibration mechanism moves the image sensor substrate in a vertical direction of the image capturing apparatus.

9. The image capturing apparatus according to claim 6, wherein a developed shape of the heat transfer member in an unassembled state is a belt-like substantially rectangular shape.

10. The image capturing apparatus according to claim 6, wherein the heat transfer member uses a graphite sheet.

* * * * *